(12) United States Patent
Aruga

(10) Patent No.: US 11,098,798 B2
(45) Date of Patent: Aug. 24, 2021

(54) CLUTCH DEVICE AND WASHING MACHINE

(71) Applicant: NIDEC SANKYO CORPORATION, Nagano (JP)

(72) Inventor: Hisayoshi Aruga, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 276 days.

(21) Appl. No.: 16/253,796

(22) Filed: Jan. 22, 2019

(65) Prior Publication Data

US 2019/0226573 A1 Jul. 25, 2019

(30) Foreign Application Priority Data

Jan. 24, 2018 (JP) .............................. JP2018-009465

(51) Int. Cl.
| | |
|---|---|
| *F16H 57/029* | (2012.01) |
| *D06F 37/30* | (2020.01) |
| *F16H 1/20* | (2006.01) |
| *F16H 57/031* | (2012.01) |
| *F16D 11/14* | (2006.01) |
| *F16H 57/02* | (2012.01) |

(52) U.S. Cl.
CPC ........... *F16H 57/029* (2013.01); *D06F 37/30* (2013.01); *F16D 11/14* (2013.01); *F16H 1/20* (2013.01); *F16H 57/031* (2013.01); *F16H 2057/02034* (2013.01)

(58) Field of Classification Search
None
See application file for complete search history.

(56) References Cited

U.S. PATENT DOCUMENTS

| | | | |
|---|---|---|---|
| 2016/0160995 A1* | 6/2016 | Biro | ................... F16H 57/0457 74/606 R |
| 2016/0355967 A1* | 12/2016 | Kim | ........................ D06F 37/30 |
| 2017/0159723 A1* | 6/2017 | Lv | ............................ F16D 11/14 |

FOREIGN PATENT DOCUMENTS

| | | |
|---|---|---|
| JP | 2014042386 A | 3/2014 |
| JP | 2016013348 A | 1/2016 |

OTHER PUBLICATIONS

Espacenet Translation JP 2014-042386, Actuator, 2014, Ariga Hisatake (Year: 2014).*

* cited by examiner

*Primary Examiner* — Cristi J Tate-Sims
(74) *Attorney, Agent, or Firm* — Cantor Colburn LLP

(57) ABSTRACT

A clutch device may include an actuator and a clutch member. The actuator may include a clutch motor; a reduction gear mechanism; an output member to be operated by a drive force of the clutch motor; a support plate in which the reduction gear mechanism is disposed on a first face side and a connection part electrically connected between members is disposed on a second face side; a first case member which covers the support plate from the first face side; and a second case member which covers the support plate from the second face side. An end part of the support plate may be sandwiched between the first case member and the second case member and the outer case.

12 Claims, 11 Drawing Sheets

CLUTCH DEVICE AND WASHING MACHINE

CROSS REFERENCE TO RELATED APPLICATION

The present application claims priority under 35 U.S.C. § 119 to Japanese Application No. 2018-009465 filed Jan. 24, 2018, the entire content of which is incorporated herein by reference.

TECHNICAL FIELD

The present invention relates to a clutch device structured to perform mechanical connection/disconnection by using an actuator having a clutch motor, and relates to a washing machine.

BACKGROUND

A washing machine has been proposed which includes a clutch device (a clutch device for a washing machine) on the way of a power transmission path for transmitting a rotation drive force of a washing machine motor to a washing tub (see Japanese Patent Laid-Open No. 2016-13348 (Patent Literature 1)). The clutch device drives an output member by an actuator including a clutch motor and a reduction gear mechanism and performs mechanical connection/disconnection by displacing a clutch member through the output member.

On the other hand, as an actuator including a reduction gear mechanism structured to transmit rotation of a clutch motor to an output member, it has been proposed that the actuator includes a support plate, a first case member which covers the support plate from one face side, and a second case member which covers the support plate from the other face side so as to structure an outer case together with the first case member (see Japanese Patent Laid-Open No. 2014-42386 (Patent Literature 2)). In the actuator, an inside of the outer case is partitioned by the support plate, the reduction gear mechanism is disposed between the one face of the support plate and the first case member, and electrically connected parts connecting between members, a switch and the like are disposed between the other face of the support plate and the second case member.

In the structure described in Patent Literature 2, the support plate is located in an inside of the outer case completely and thus a gap space exists between the support plate and a side wall of the outer case. Therefore, movement of a foreign matter may be occurred by passing around the support plate from the one face side to the other face side of the support plate, or movement of a foreign matter may be occurred from the other face side to the one face side of the support plate. For example, after a reduction gear mechanism is arranged between the first case member and the support plate, when electric connection is performed by soldering on the other face side of the support plate, a solder particle may be dropped in a space where the reduction gear mechanism is disposed (on the one face side of the support plate) through a space existing around the support plate and, in this case, the solder particle may be caught to cause that the reduction gear mechanism is not operated properly. Further, in a case that grease is applied to the reduction gear mechanism, the grease may be flowed to a side (the other face side of the support plate) where the electrically connected parts are provided through the space existing around the support plate and, in this case, the switch may not be operated properly by the grease.

SUMMARY

In view of the problem described above, at least an embodiment of the present invention provides a clutch device in which a foreign matter is restrained from moving and passing around a support plate between one face side and the other face side of the support plate, and provide a washing machine.

To achieve the above mentioned objective, at least an embodiment of the present invention provides a clutch device including an actuator, and a clutch member structured to be driven by the actuator to perform mechanical connection and disconnection. The actuator includes a clutch motor, a reduction gear mechanism structured to transmit rotation of the clutch motor, an output member structured to be operated by a drive force of the clutch motor transmitted through the reduction gear mechanism, a support plate in which the reduction gear mechanism is disposed on one face side and a connection part connected electrically between members is disposed on the other face side, a first case member which covers the support plate from the one face side and sections a first space in which the reduction gear mechanism is disposed between the support plate and the first case member, and a second case member which covers the support plate from the other face side and structures an outer case together with the first case member in a state that a second space in which the connection part is disposed is sectioned between the support plate and the second case member. An end part of the support plate is sandwiched between the first case member and the second case member and structures a part of a side face of the outer case.

In at least an embodiment of the present invention, the end part of the support plate is sandwiched between the first case member and the second case member and structures a part of the side face of the outer case and, in a portion where the end part of the support plate structures the side face of the outer case, no gap space connecting the one face side of the support plate with the other face side is existed around the support plate. Therefore, a foreign matter such as a solder particle or grease can be restrained from moving and passing around the support plate between the one face side of the support plate and the other face side.

In at least an embodiment of the present invention, it may be structured that the support plate includes a plate part facing the first case member and the second case member, and a side wall which is protruded from an edge of the plate part toward at least one of the first case member and the second case member, and the side wall is sandwiched as the end part of the support plate between the first case member and the second case member and structures the part of the side face of the outer case. According to this structure, a large space can be secured on the side where the side wall is protruded in the support plate.

In at least an embodiment of the present invention, it may be structured that the first case member, the end part of the support plate and the second case member are located on a common plane in the side face of the outer case.

In at least an embodiment of the present invention, it may be structured that a labyrinth seal part in which a boundary between the first case member and the support plate is bent is structured between an inside of the outer case and an outside in an abutting part of the first case member with the end part of the support plate. According to this structure, air containing moisture or dust and a fluid such as water are hard to be flowed from the outside into the inside between the first case member and the support plate.

In at least an embodiment of the present invention, it may be structured that a second labyrinth seal part in which a boundary between the support plate and the second case member is bent is structured between an inside of the outer case and an outside in an abutting part of the end part of the support plate and the second case member. According to this structure, air containing moisture or dust and a fluid such as water are hard to be flowed from the outside into the inside between the second case member and the support plate.

In at least an embodiment of the present invention, it may be structured that an abutting part of the first case member with the end part of the support plate is provided over the entire periphery of the support plate.

In at least an embodiment of the present invention, it may be structured that the connection part includes a connection part which is electrically connected with a switch structured to turn on and off corresponding to a position of the output member, and a connection part where a terminal of the clutch motor is electrically connected with a wiring line member.

In at least an embodiment of the present invention, it may be structured that the output member is protruded to the outside of the outer case through a first opening part provided between the support plate and the second case member, and the wiring line member used in the connection part is extended from the inside of the outer case to the outside through a second opening part provided between the support plate and the second case member.

A washing machine comprising the clutch device to which at least an embodiment of the present invention is applied includes, for example, a washing machine motor, a washing tub, a pulsator disposed in the washing tub, and a drive force transmission mechanism structured to transmit a rotation drive force of the washing machine motor to the washing tub and the pulsator. The drive force transmission mechanism includes the clutch device on a way of a power transmission path from the washing machine motor to the washing tub.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figures 4A, 4B:
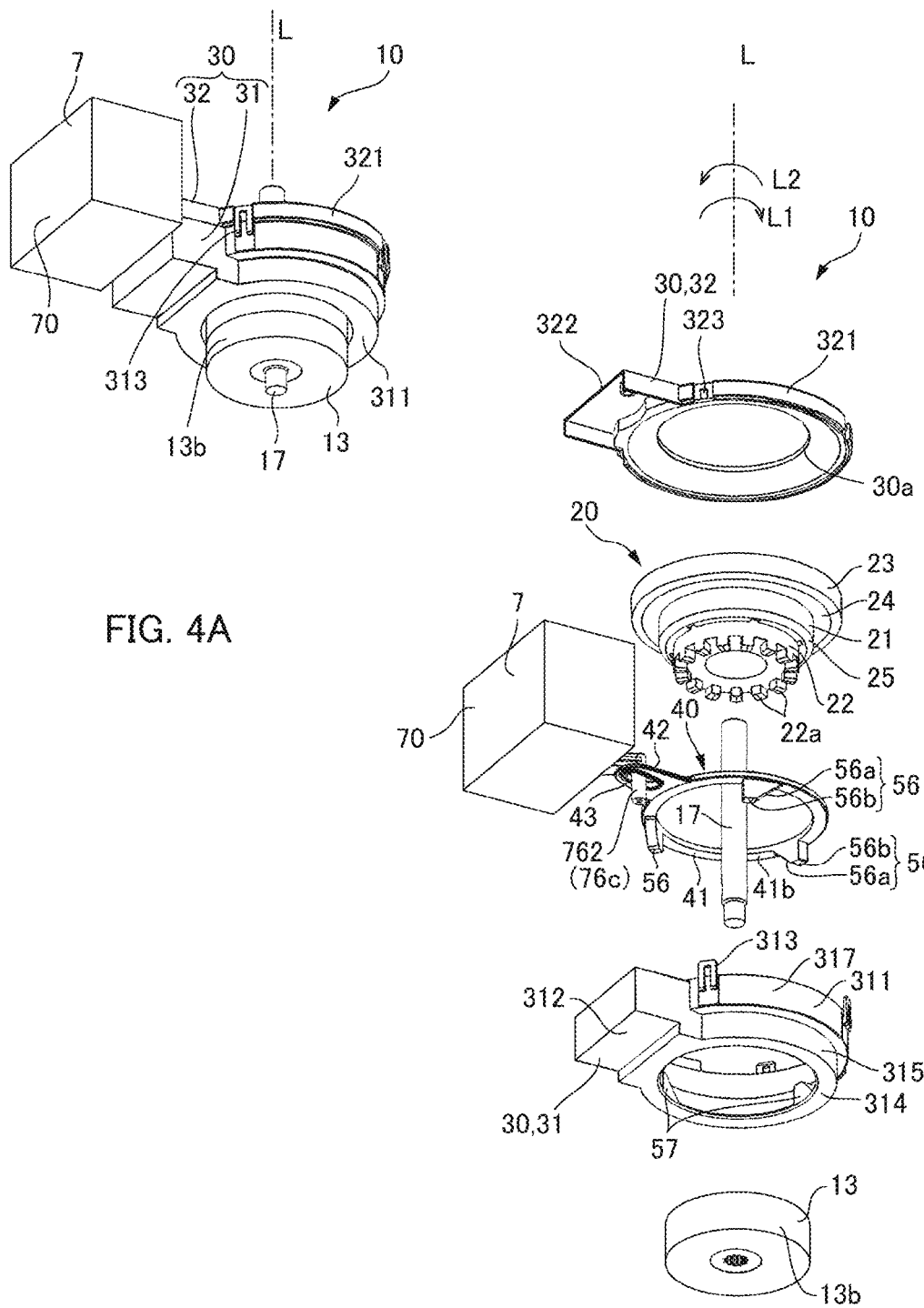
FIG. 4A and FIG. 4B are perspective views showing a clutch device viewed from an obliquely lower side to which at least an embodiment of the present invention is applied.
Figure 5:
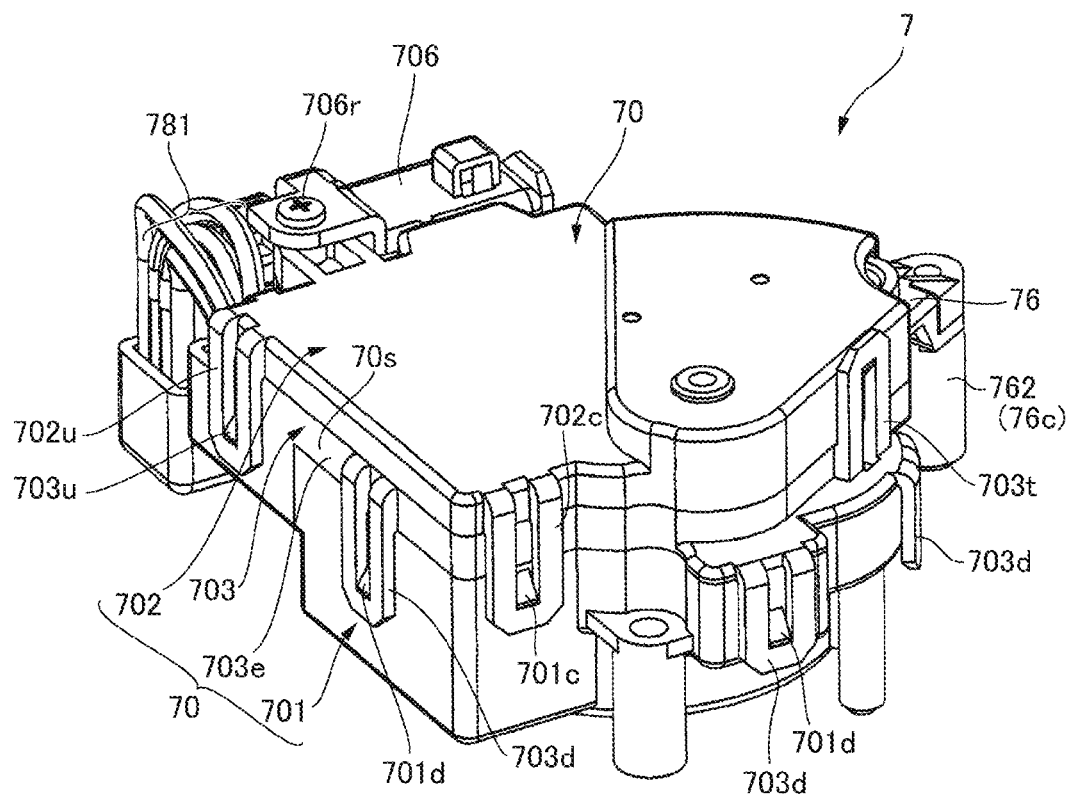
FIG. 5 is a perspective view showing an actuator used in the clutch device shown in FIG. 2 and the like, which is viewed from an obliquely upper side.
Figure 6:
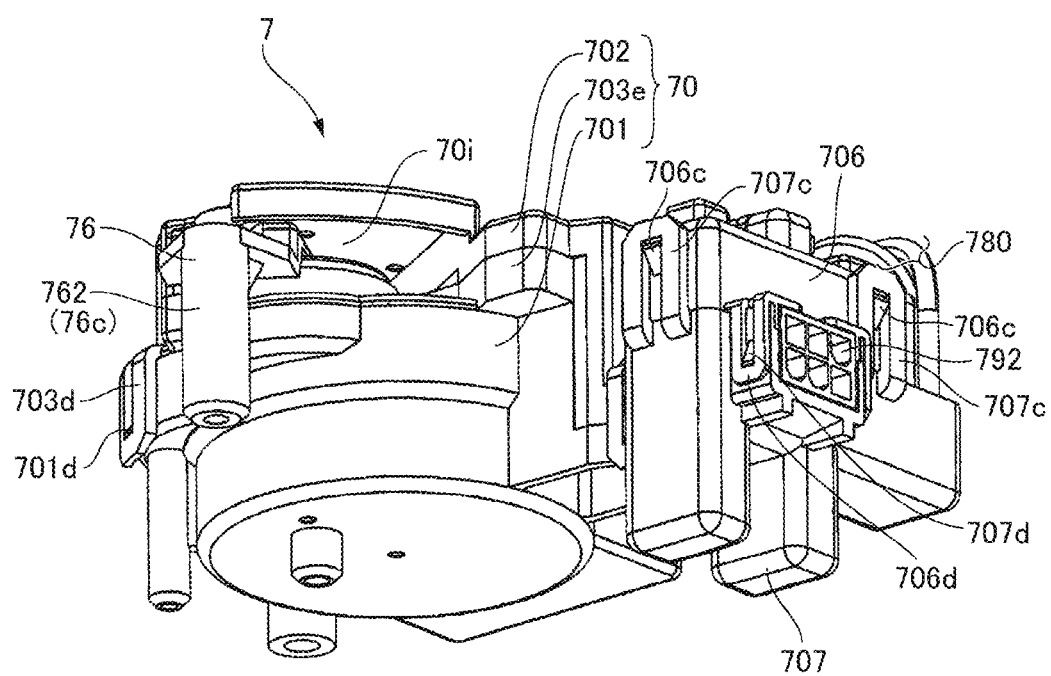
FIG. 6 is a perspective view showing the actuator in FIG. 5 which is viewed from an obliquely lower side.

At least an embodiment in accordance with the present invention will be described below with reference to the accompanying drawings. In FIG. 2 through FIG. 4B, an actuator 7 is schematically shown as a rectangular solid shape but an actual appearance of the actuator 7 is shown in FIG. 5 and FIG. 6.

(Entire Structure)

Figure 1:
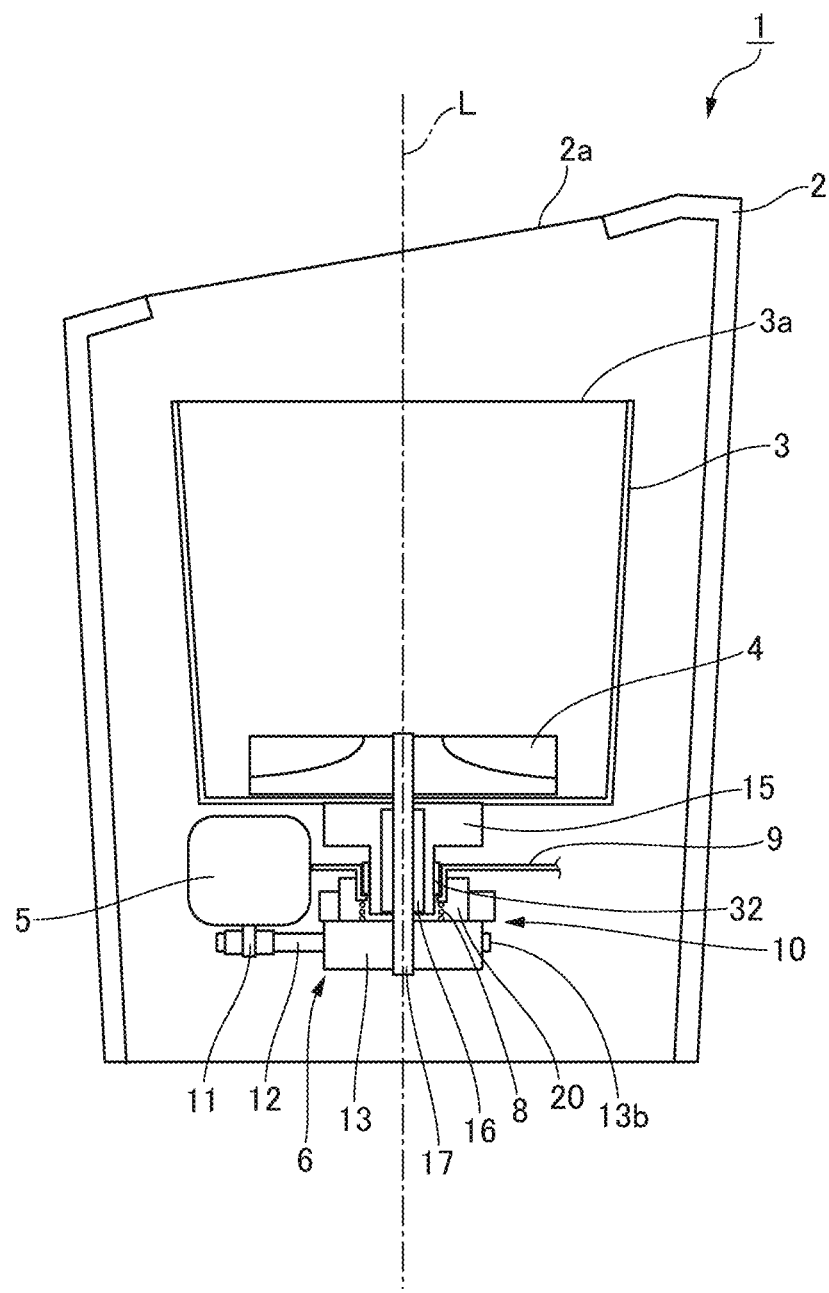
FIG. 1 is a longitudinal sectional view showing a schematic structure of a washing machine to which at least an embodiment of the present invention is applied.

FIG. 1 is a longitudinal sectional view showing a schematic structure of a washing machine 1 to which at least an embodiment of the present invention is applied. As shown in FIG. 1, the washing machine 1 includes a main body frame 2. The main body frame 2 is provided in its upper face with an opening part 2a through which laundry such as clothes is taken in and out. The main body frame 2 is formed in a rectangular tube shape and its under face is opened. A washing tub 3 in a bottomed tube shape is accommodated in an inside of the main body frame 2 so that its opening part 3a faces an upper side. The washing tub 3 is hanged from the main body frame 2 through a buffer member not shown and is set in a rotatable state around its axial line "L". A pulsator 4 is disposed in a bottom portion on an inner side of the washing tub 3.

A washing machine motor 5 is disposed on a lower side of the washing tub 3. A rotation drive force of the washing machine motor 5 is transmitted to the washing tub 3 and the pulsator 4 through a drive force transmission mechanism 6. The drive force transmission mechanism 6 includes a clutch device 10 structured to connect and disconnect transmission of a rotation drive force of the washing machine motor 5 to the washing tub 3 on the way of a power transmission path from the washing machine motor 5 to the washing tub 3. Further, a sensor (not shown) for detecting rotation of the washing tub 3 is disposed on a lower side of the washing tub 3. The clutch device 10 is supported by the main body frame 2 through a support plate 9. In this embodiment, the support plate 9 is formed in a cup shape. However, in FIG. 1 and in FIG. 2 described below, only a bottom plate part is shown.

When the washing machine 1 is operated in a state that clothes have been put into the washing tub 3 through the opening part 2a of the main body frame 2, washing water is supplied inside the washing tub 3 through a water supply pipe not shown. After that, the washing machine motor 5 is driven and, as a result, the pulsator 4 is rotated and washing of clothes inside the washing tub 3 is performed. During washing operations, the clutch device 10 is set in a disconnecting state that transmission of the rotation drive force of the washing machine motor 5 to the washing tub 3 is disconnected. Therefore, the washing tub 3 is stopped.

Washing operations are finished and, when washing water has been drained from the washing tub 3, a dewatering operation for spin-drying clothes is performed. In the dewatering operation, the clutch device 10 is set in a connecting state that the rotation drive force of the washing machine motor 5 is transmitted to the washing tub 3 and the washing machine motor 5 is driven in this state. As a result, the pulsator 4 and the washing tub 3 are integrally rotated and thus clothes in the washing tub 3 are also rotated together with the washing tub 3 and the pulsator 4. Therefore, the clothes are spin-dried by a centrifugal force.

(Drive Force Transmission Mechanism)

Figure 2:
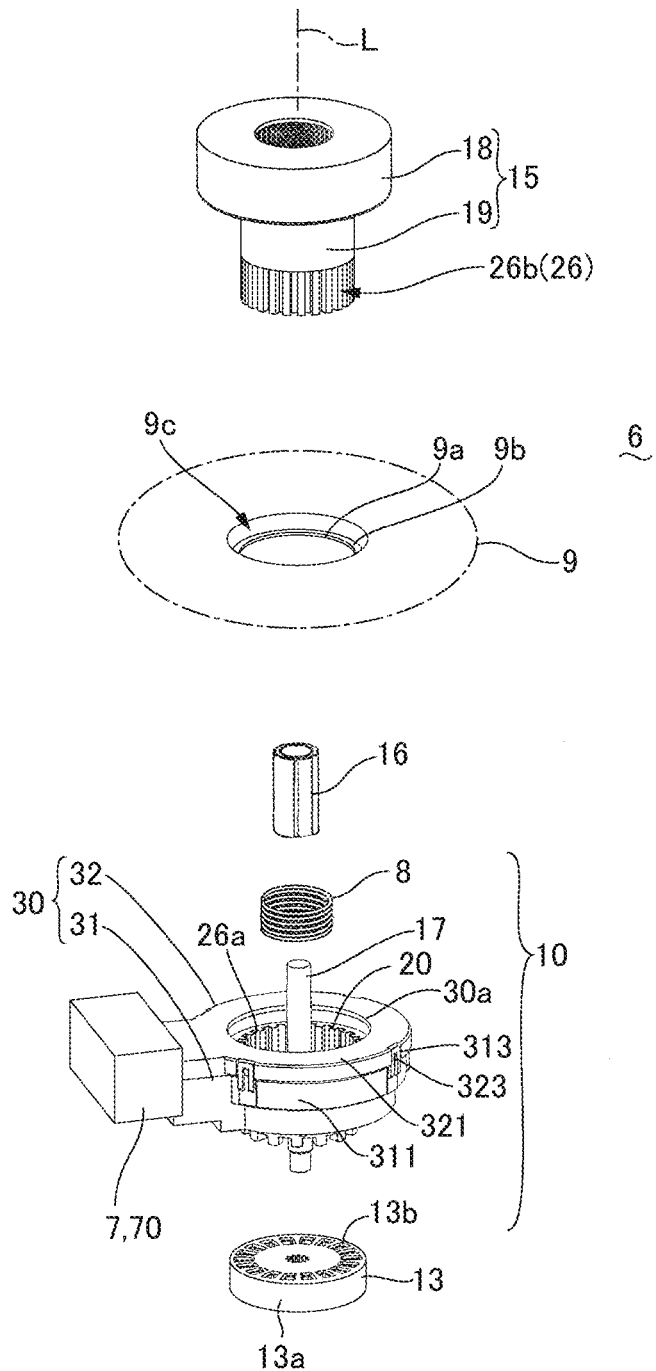
FIG. 2 is an exploded perspective view showing a main part such as a drive force transmission mechanism shown in FIG. 1.

FIG. 2 is an exploded perspective view showing a main part such as the drive force transmission mechanism 6 shown in FIG. 1. As shown in FIG. 1 and FIG. 2, the drive force transmission mechanism 6 includes a first rotor body 13 to which a rotation drive force of an output shaft 11 of the washing machine motor 5 is transmitted through an endless belt 12, a rotation shaft 17 coaxially attached to the first rotor body 13, a connection member 15 coaxially connected with a lower end portion of the washing tub 3, and a second rotor body 20 connected with the connection member 15. The first rotor body 13 is formed in a disk shape and is coaxially disposed with the washing tub 3 on a lower side of the washing tub 3. A circular outer peripheral face of the first rotor body 13 is an attaching face 13a where the endless belt 12 is attached.

As shown in FIG. 2, the first rotor body 13 is provided with a teeth part 13b on its upper end face. The teeth part 13b is formed of a plurality of projections which are extended in a radial direction at equal angular intervals. A lower end portion of the rotation shaft 17 is connected with the first rotor body 13 and its upper end portion is penetrated through a bottom part of the washing tub 3 and connected with the pulsator 4. Therefore, the rotation drive force of the washing machine motor 5 is transmitted to the pulsator 4 through the endless belt 12, the first rotor body 13 and the rotation shaft 17. In other words, a power transmission path including the endless belt 12, the first rotor body 13 and the rotation shaft 17 is structured between the washing machine motor 5 and the pulsator 4.

The rotation shaft 17 is disposed on an inner side of a tube-shaped member 16. The tube-shaped member 16 and the rotation shaft 17 are not connected with each other and the tube-shaped member 16 is relatively rotatable with respect to the rotation shaft 17. An outer peripheral side of the tube-shaped member 16 is connected with the connection member 15 and the tube-shaped member 16 and the connection member 15 are integrally turned with each other. The connection member 15 is provided, from an upper side to a lower side in an axial line "L" direction, with a large diameter flange part 18 connected with the washing tub 3 and a small diameter tube part 19 having a smaller diameter than the large diameter flange part 18. The tube-shaped member 16 is inserted on an inner side of the small diameter tube part 19, and the tube-shaped member 16 is connected with the small diameter tube part 19 so as to be turned together with the connection member 15. The second rotor body 20 is coaxially connected with an outer peripheral side of a lower side portion of the small diameter tube part 19.

An inner peripheral face of the second rotor body 20 is formed with a plurality of vertical grooves 26a and an outer peripheral face of the small diameter tube part 19 is formed with a plurality of projections 26b which structure a serration 26 together with the vertical grooves 26a. Therefore, the second rotor body 20 is connected with the connection member 15 in a relatively movable state in the axial line "L" direction and in a rotatable state together with the connection member 15 by the serration 26.

The support plate 9 is a member for supporting the clutch device 10 at a predetermined position on a lower side with respect to the washing tub 3 and is hanged from the main body frame 2 together with the washing tub 3 through a buffer member not shown. The support plate 9 is attached with an upper case 32 which covers an upper side portion of the clutch device 10 from a lower side, and the upper case 32 is fixed to the support plate 9 and thereby the clutch device 10 is supported by the support plate 9.

The support plate 9 is provided with a ring-shaped protruded part 9b which is formed with a through hole 9a in its center portion through which the small diameter tube part 19 of the connection member 15 is penetrated in the axial line "L" direction. The ring-shaped protruded part 9b is penetrated through an opening part 30a provided in the case 30 and is protruded to a lower side, and its lower end portion is inserted into an inner side of the second rotor body 20. Further, an urging member 8 comprised of a compression coil spring is inserted between a lower end face of the ring-shaped protruded part 9b and the second rotor body 20. The urging member 8 urges the second rotor body 20 to a lower side (direction toward the first rotor body 13). In addition, a ring-shaped recessed part 9c is formed on an upper face side of the ring-shaped protruded part 9b in the support plate 9. A ring-shaped bearing (not shown) which rotatably supports the washing tub 3 from a lower side through the connection member 15 is disposed inside the recessed part 9c.

(Structure of Clutch Device 10)

Figure 3A:
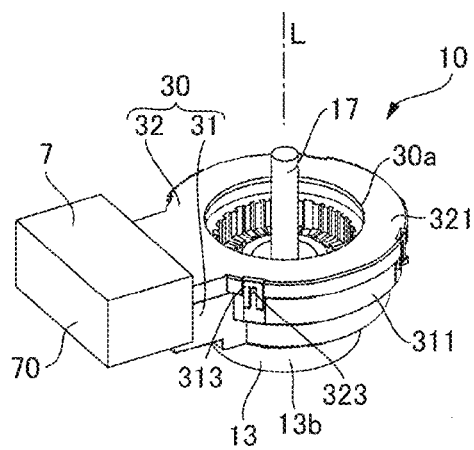
FIG. 3A and FIG. 3B are perspective views showing a clutch device viewed from an obliquely upper side to which at least an embodiment of the present invention is applied.
Figure 3B:
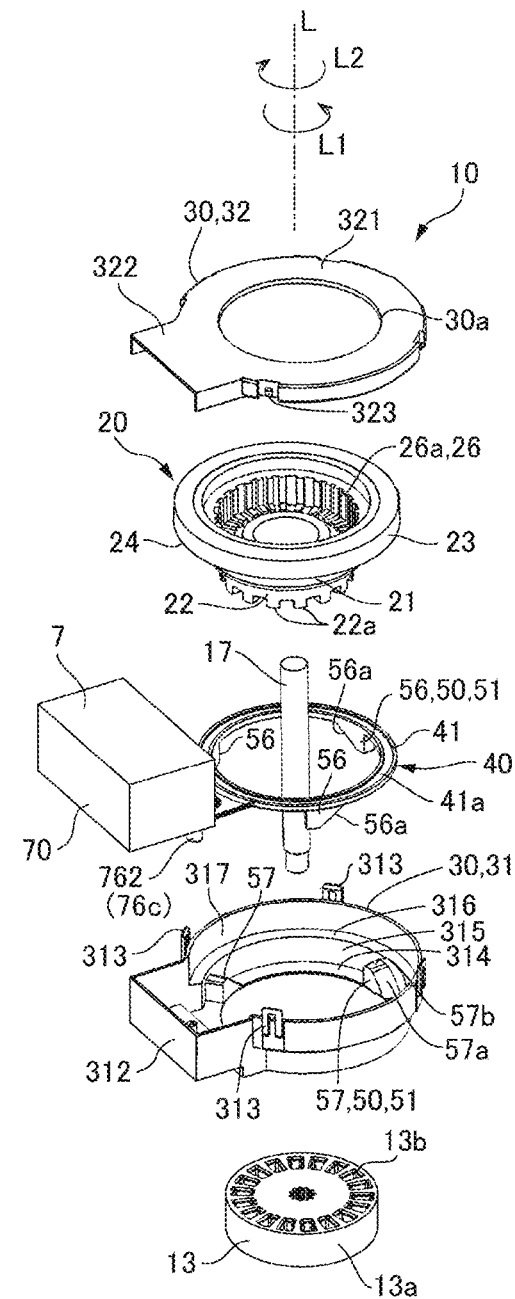

FIG. 3A and FIG. 3B are perspective views showing the clutch device 10 viewed from an obliquely upper side to which at least an embodiment of the present invention is applied. FIG. 3A is a perspective view showing the entire clutch device 10 and FIG. 3B is its exploded perspective view. FIG. 4A and FIG. 4B are perspective views showing the clutch device 10 viewed from an obliquely lower side to which at least an embodiment of the present invention is applied. FIG. 4A is a perspective view showing the entire clutch device 10 and FIG. 4B is its exploded perspective view.

As shown in FIG. 3A and FIG. 3B and FIG. 4A and FIG. 4B, the clutch device 10 includes the second rotor body 20 engageable with the first rotor body 13, a clutch member 40 for displacing the second rotor body 20, and an actuator 7 structured to reciprocatedly move the clutch member 40 between a connecting position where the second rotor body 20 and the first rotor body 13 are mechanically connected with each other and a disconnecting position where a mechanical connection of the second rotor body 20 with the first rotor body 13 is released. Further, the clutch device 10 includes the urging member 8 shown in FIG. 1 and FIG. 2. The urging member 8 urges the clutch member 40 to a lower side through the second rotor body 20. The clutch member 40 is provided with a circular ring-shaped part 41 and an engaging plate part 42 which is protruded to an outer side in a radial direction from a portion in a circumferential direction of the circular ring-shaped part 41. The actuator 7 reciprocatedly swings the clutch member 40 around the axial line "L" which passes a center of the circular ring-shaped part 41.

The clutch device 10 includes a case 30 in which the clutch member 40 and the like are accommodated. The case 30 includes a lower case 31 which covers the clutch member 40 and the like from a lower side, and an upper case 32 which covers the clutch member 40 and the like from an upper side.

The lower case 31 is provided with a first case part 311 formed in a cylindrical tube shape and a second cover part 312 in a rectangular tube shape which is protruded to an outer side in a radial direction from the first case part 311. The upper case 32 is provided with a first cover part 321 in a circular ring shape which is overlapped with the first case part 311 of the lower case 31, and a second cover part 322 in a rectangular tube shape which is protruded to an outer side in the radial direction from the first cover part 321 and is overlapped with the second cover part 312 of the lower case 31. Hooks 313 protruded toward an upper side from the lower case 31 are engaged with engaging projections 323 formed on a side face of the upper case 32 and thereby the lower case 31 and the upper case 32 are connected with each other. In this state, the second rotor body 20 and the circular ring-shaped part 41 of the clutch member 40 are disposed turnably around the axial line "L" between the first case part 311 and the first cover part 321.

In this embodiment, the first case part 311 of the lower case 31 is provided with a circular ring-shaped bottom plate part 314, a first body part 315 in a cylindrical tube shape which is protruded to an upper side from an outer circumferential edge of the bottom plate part 314, and a second body part 317 in a cylindrical tube shape which is connected with the first body part 315 on an upper side. The second body part 317 has a larger diameter than the first body part 315. Therefore, an inner peripheral face of the first case part 311 is formed with a ring-shaped step part 316 which faces an upper side between the first body part 315 and the second body part 317.

(Structure of Second Rotor Body 20)

The second rotor body 20 is provided with a first body part 21 in a cylindrical tube shape, a circular ring-shaped flange part 23 enlarged from an upper end part of the first body part 21, and a second body part 22 in a cylindrical tube shape which is protruded to a lower side from the first body part 21. A plurality of vertical grooves 26a structuring the serration 26 is formed on an inner peripheral face of the first body part 21. Since the flange part 23 has a diameter larger than that of the first body part 21, an outer peripheral face of the second rotor body 20 is formed with a first step part 24 in a ring shape which faces a lower side between the flange part 23 and the first body part 21. The first step part 24 is overlapped with the bottom plate part 314 in a circular ring shape of the lower case 31 on an upper side through the circular ring-shaped part 41 of the clutch member 40. Further, since the second body part 22 has a diameter smaller than that of the first body part 21, an outer peripheral face of the second rotor body 20 is formed with a second step part 25 in a ring shape which faces a lower side between the second body part 22 and the first body part 21.

A lower end part of the second body part 22 is exposed to a lower side (side where the first rotor body 13 is located) through a hole 314a formed in the bottom plate part 314 of the lower case 31. Further, an under face of the second body part 22 is formed with a teeth part 22a comprised of a plurality of projections which are extended in the radial direction at equal angular intervals. The teeth part 22a is capable of engaging with the teeth part 13b of the first rotor body 13 when the second rotor body 20 is moved to a lower side.

Therefore, the second rotor body 20 is moved to a lower side in the axial line "L" direction and, when the teeth part 22a and the teeth part 13b of the first rotor body 13 are engaged with each other, the second rotor body 20 is integrally rotated with the first rotor body 13 in a coaxial state. As a result, a rotation drive force of the washing machine motor 5 shown in FIG. 1 is transmitted to the washing tub 3 through the endless belt 12, the first rotor body 13, the second rotor body 20 and the connection member 15. In other words, a power transmission path including the endless belt 12, the first rotor body 13, the second rotor body 20 and the connection member 15 is provided between the washing machine motor 5 and the washing tub 3.

The clutch member 40 is disposed between the lower case 31 and the second rotor body 20. The clutch member 40 is provided with the circular ring-shaped part 41 and the engaging plate part 42 which is protruded to an outer side in the radial direction from one position in the circumferential direction of the circular ring-shaped part 41. The engaging plate part 42 is formed with an elongated hole 43 which is extended in the radial direction. A drive pin 762 (operating point 76c) formed in an output arm 76 of the actuator 7 is fitted to the elongated hole 43. The circular ring-shaped part 41 has the same size as the ring-shaped bottom plate part 314 of the lower case 31 and the ring-shaped first step part 24 of the second rotor body 20. The first step part 24 of the second rotor body 20 is overlapped with the bottom plate part 314 of the first case part 311 of the lower case 31 through the circular ring-shaped part 41 of the clutch member 40.

An upper face 41a of the circular ring-shaped part 41 is formed to be a flat face without protrusions and recesses, and the first step part 24 of the second rotor body 20 is also formed to be a flat face without protrusions and recesses. Therefore, the upper face 41a of the circular ring-shaped part 41 and the first step part 24 of the second rotor body 20 are overlapped with each other in a surface-contacted state.

A guide mechanism 50 structured to move the clutch member 40 to a connecting position and a disconnecting position described below when the clutch member 40 is turned around the axial line "L" passing through the center of the circular ring-shaped part 41 is structured between the under face 41b of the circular ring-shaped part 41 and the bottom plate part 314 of the lower case 31. In this embodiment, when the clutch member 40 is turned around the axial line "L" passing through the center of the circular ring-shaped part 41, the clutch member 40 is moved in the axial line "L" direction and moved to the disconnecting position and the connecting position. Therefore, the guide mechanism 50 structured between the under face 41b of the circular ring-shaped part 41 and the ring-shaped bottom plate part 314 of the lower case 31 is provided with a cam mechanism 51.

The cam mechanism 51 is provided with a first protruded part 56 which is protruded to a lower side from the under face 41b of the circular ring-shaped part 41 of the clutch member 40 so that its slant face 56a faces one side "L1" around the axial line "L". The first protruded part 56 is provided with a lower end face 56b (sliding part), which is a flat face perpendicular to the axial line "L", on a portion adjacent to the slant face 56a on the other side "L2" around the axial line "L". In this embodiment, the first protruded part 56 is formed at three positions in a circumferential direction. A portion of the under face 41b where the first protruded part 56 is not formed is formed in a flat face perpendicular to the axial line "L".

The cam mechanism 51 is provided with a second protruded part 57 which is protruded to an upper side from an upper face of the bottom plate part 314 of the lower case 31 so that its slant face 57a (first cam face) faces the other side "L2" around the axial line. The second protruded part 57 is provided with an upper end face 57b (second cam face) which is a flat face perpendicular to the axial line "L" in a portion adjacent to the slant face 57a on one side "L1" around the axial line "L". In this embodiment, the second protruded part 57 is formed at three positions in the circumferential direction. A face of the upper face of the bottom plate part 314 where the second protruded part 57 is not formed is formed to be a flat face (third cam face) perpendicular to the axial line "L".

Therefore, when the clutch member 40 is driven by the drive pin 762 of the actuator 7 and turned to one side "L1" around the axial line "L", the first protruded part 56 of the clutch member 40 runs on the slant face 57a of the second protruded part 57 formed on the bottom plate part 314 of the lower case 31 and the first protruded part 56 is overlapped with the upper end face 57b of the second protruded part 57. As a result, the clutch member 40 pushes up the second rotor body 20 to an upper side against an urging force of the urging member 8 shown in FIG. 1. Therefore, engagement of the teeth part 22a of the second rotor body 20 with the teeth part 13b of the first rotor body 13 is released and thus a mechanical connection of the second rotor body 20 with the first rotor body 13 is released. Accordingly, even when the first rotor body 13 is rotated, the second rotor body 20 does not rotate and thus the pulsator 4 shown in FIG. 1 is rotated but the washing tub 3 is not rotated.

When the clutch member 40 is turned to the other side "L2" around the axial line "L" from this state by being driven by the drive pin 762 of the actuator 7, the first protruded part 56 slides down the slant face 57a of the second protruded part 57 formed on the bottom plate part 314 of the lower case 31. As a result, the clutch member 40 and the second rotor body 20 are moved to a lower side by an urging force of the urging member 8 shown in FIG. 1. Therefore, the teeth part 22a and the teeth part 13b of the first rotor body 13 are engaged with each other and thus the second rotor body 20 and the first rotor body 13 are mechanically connected with each other. Accordingly, when the first rotor body 13 is rotated, the second rotor body 20 is also rotated and thus both of the pulsator 4 and the washing tub 3 shown in FIG. 1 are rotated.

(Entire Structure of Actuator 7)

Figure 7A:
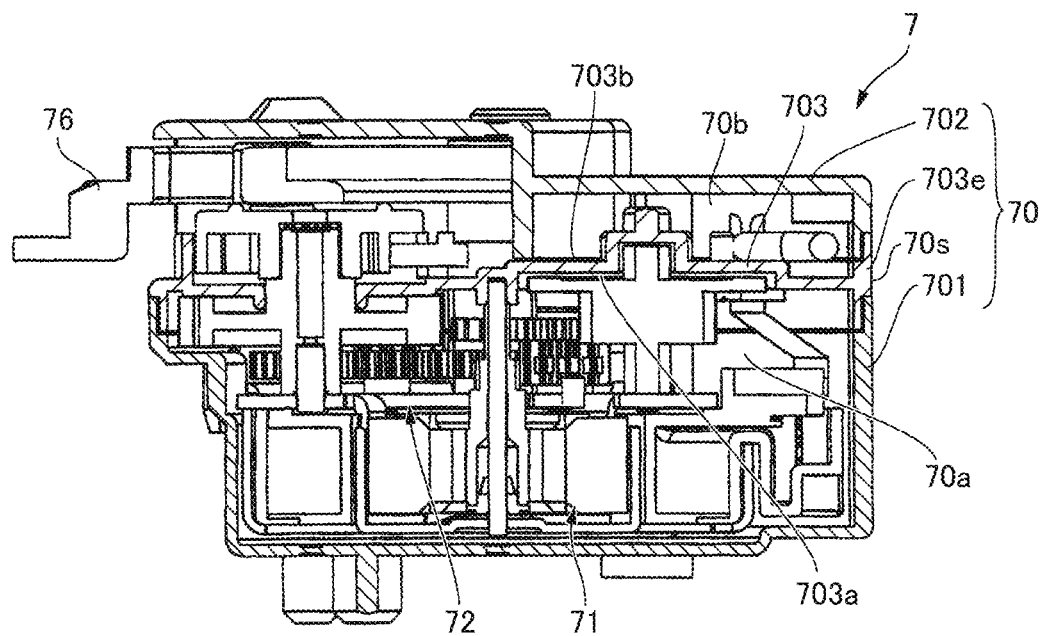
FIG. 7A, FIG. 7B and FIG. 7C are cross-sectional views showing the actuator in FIG. 5.
Figure 7B:
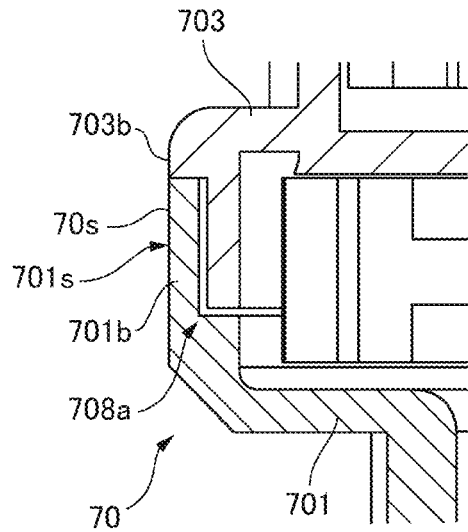
Figure 7C:
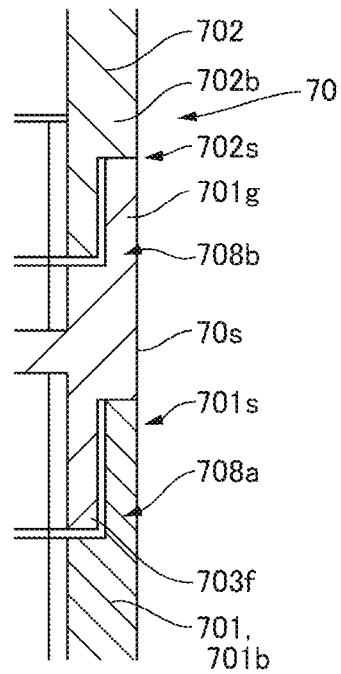
Figure 8:
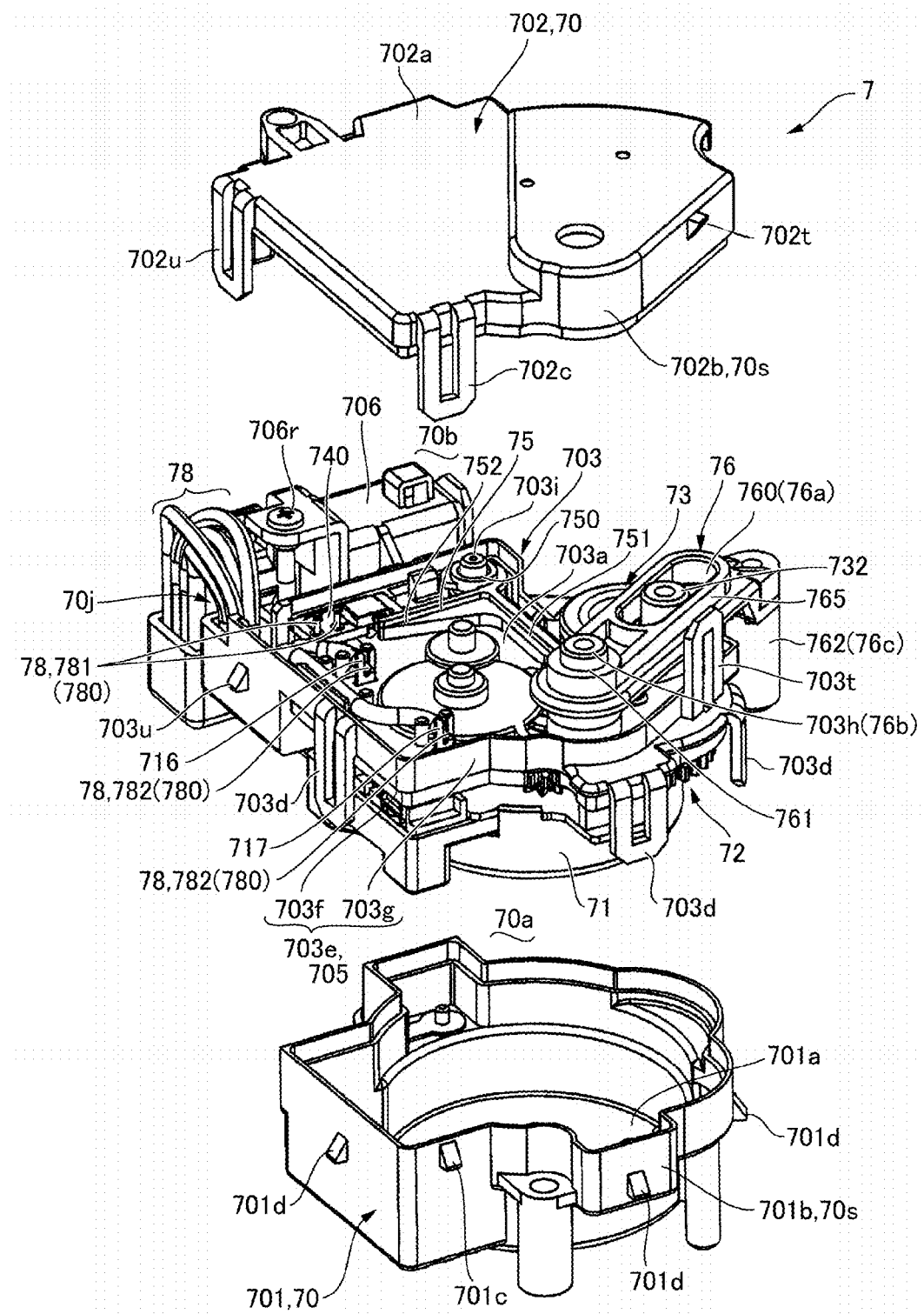
FIG. 8 is an exploded perspective view showing a state that the actuator shown in FIG. 5 is disassembled, which is viewed from an obliquely upper side.
Figure 9:
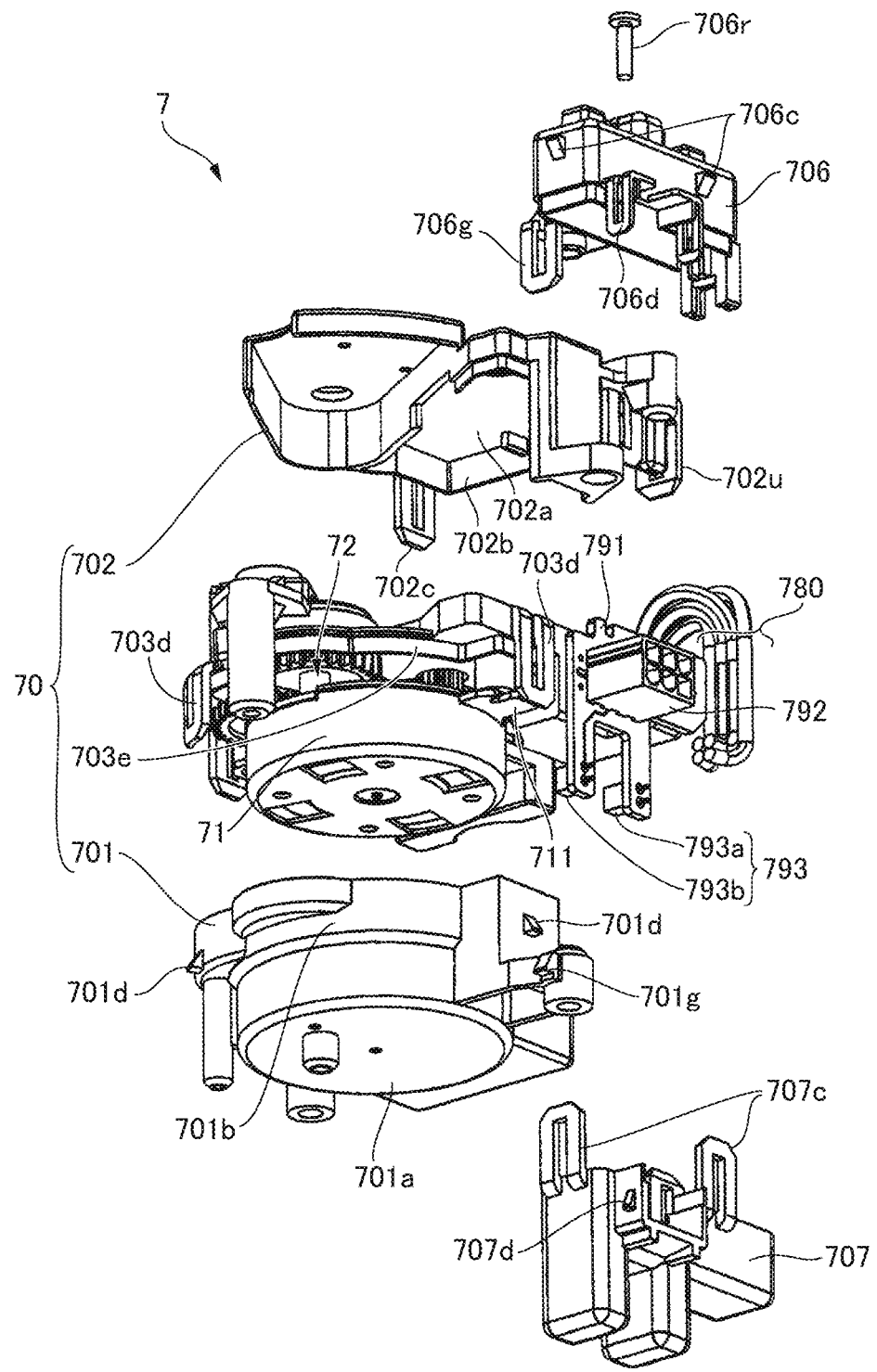
FIG. 9 is an exploded perspective view showing a state that the actuator shown in FIG. 5 is disassembled, which is viewed from an obliquely lower side.

FIG. 5 is a perspective view showing the actuator 7 used in the clutch device 10 shown in FIG. 2 and the like, which is viewed from an obliquely upper side. FIG. 6 is a perspective view showing the actuator 7 in FIG. 5 which is viewed from an obliquely lower side. FIG. 7A, FIG. 7B and FIG. 7C are cross-sectional views showing the actuator 7 in FIG. 5. FIG. 7A is a cross-sectional view showing the entire actuator 7, FIG. 7B is a cross-sectional view showing a portion near a side face of an outer case 70, and FIG. 7C is a cross-sectional view showing another portion of the side face. FIG. 8 is an exploded perspective view showing a state that the actuator 7 shown in FIG. 5 is disassembled and which is viewed from an obliquely upper side. FIG. 9 is an exploded perspective view showing a state that the actuator 7 shown in FIG. 5 is disassembled and which is viewed from an obliquely lower side.

As shown in FIG. 5 and FIG. 6, the actuator 7 includes an outer case 70 and an output arm 76 whose tip end side is protruded from the outer case 70. As shown in FIG. 5 through FIG. 9, the actuator 7 includes a support plate 703, a first case member 701 which covers one face 703a side of the support plate 703 to section a first space 70a, and a second case member 702 which covers the other face 703b side of the support plate 703 to section a second space 70b.

The outer case 70 is structured of the first case member 701 and the second case member 702. As described in detail below, a clutch motor 71 and a reduction gear mechanism 72 are disposed in the first space 70a on the one face 703a side of the support plate 703, and a crank member 73, a base end side of the output arm 76 and the like are disposed in the second space 70b on the other face 703b side of the support plate 703.

In the outer case 70, the first case member 701 is provided with an end plate part 701a facing the support plate 703 and a side plate part 701b which is bent from an edge of the end plate part 701a toward the second case member 702. The second case member 702 is provided with an end plate part 702a facing the support plate 703 and a side plate part 702b which is bent from an edge of the end plate part 702a toward the first case member 701.

In this embodiment, an end part 703e of the support plate 703 is sandwiched between the side plate part 701b of the first case member 701 and the side plate part 702b of the second case member 702 to structure a part of a side face 70s of the outer case 70.

More specifically, the support plate 703 is provided with a plate part 703c which faces the end plate part 701a of the first case member 701 and the end plate part 702a of the second case member 702, a first side wall 703f protruded from an edge of the plate part 703c to a side of the first case member 701, and a second side wall 703g protruded from the edge of the plate part 703c to a side of the second case member 702. The first side wall 703f and the second side wall 703g are sandwiched, as the end part 703e of the support plate 703, between the side plate part 701b of the first case member 701 and the side plate part 702b of the second case member 702 to structure a part of the side face 70s of the outer case 70. In this embodiment, in the side face 70s of the outer case 70, the side plate part 701b of the first case member 701, the end part 703e of the support plate 703, and the side plate part 702b of the second case member 702 are located on a common plane.

In this embodiment, as shown in FIG. 7B and FIG. 7C, in an abutting part 701s of the first case member 701 with the end part 703e of the support plate 703, a first labyrinth seal part 708a in which a boundary between the first case member 701 and the support plate 703 is bent is structured between an inside of the outer case 70 and its outside. Further, in an abutting part 702s of the end part 703e of the support plate 703 with the second case member 702, a second labyrinth seal part 708b in which a boundary between the support plate 703 and the second case member 702 is bent is structured between the inside of the outer case 70 and its outside. Therefore, air containing moisture or dust and a fluid such as water are hard to be flowed into the inside from the outside between the first case member 701 and the support plate 703 and between the support plate 703 and the second case member 702. In this embodiment, the first case member 701, the end part 703e of the support plate 703 and the abutting part 702s are provided over the entire periphery of the support plate 703. Further, in this embodiment, for example, the abutting part 702s of the end part 703e of the support plate 703 with the second case member 702 is provided over a substantially entire region except a first opening part 70i (see FIG. 6) and a second opening part 70j (see FIG. 8) described below in the entire periphery of the support plate 703.

In the outer case 70 structured as described above, the second case member 702 is formed with an engagement protruded part 702c which is protruded from the end plate part 702a toward the first case member 701 in a state connected with the side plate part 702b, and the side plate part 701b of the first case member 701 is formed with an engaging projection 701c which is engaged with the engagement protruded part 702c. Further, the support plate 703 is formed with an engagement protruded part 703d which is protruded from the end part 703e toward the first case member 701, and the side plate part 701b of the first case member 701 is formed with an engaging projection 701d which is engaged with the engagement protruded part 703d. Further, the second case member 702 is formed with an engagement protruded part 702u which is protruded from the end plate part 702a toward the support plate 703 in a state connected with the side plate part 702b, and the support plate 703 is formed with an engaging projection 703u which is engaged with the engagement protruded part 702u. Further, the support plate 703 is formed with an engagement protruded part 703t which is protruded toward the second case member 702, and the second case member 702 is formed with an engaging projection 702t which is engaged with the engagement protruded part 703t. Therefore, when the engagement protruded part 703d is engaged with the engaging projection 701d in a state that the first case member 701 and the support plate 703 are overlapped with each other, the first case member 701 and the support plate 703 are connected with each other. Further, when the engagement protruded part 702c is engaged with the engaging projection 701c in a state that the first case member 701, the support plate 703 and the second case member 702 are overlapped with each other, the first case member 701 and the second case member 702 are connected with each other. Further, in the state that the first case member 701, the support plate 703 and the second case member 702 are overlapped with each other, when the engagement protruded parts 702u and 703t are engaged with the engaging projections 703u and 702t, the support plate 703 and the second case member 702 are connected with each other. As a result, the outer case 70 is structured.

(Structure of Connector 792 and the Like)

As shown in FIG. 6 and FIG. 9, a first cover 706 which holds a wiring circuit board 791 in its inside is fixed to the side plate part 702b of the second case member 702 by a bolt 706r, and a connector 792 and a sensor 793 are mounted on the wiring circuit board 791. In this embodiment, the sensor 793 is a photo-interrupter having a light emitting element 793a and a light receiving element 793b and is used for detecting a position of the clutch member 40, rotation of the washing tub 3 or the like. A wiring line member 780 which is a lead wire extended from inside of the outer case 70 is electrically connected with the wiring circuit board 791.

The sensor 793 is covered by a second cover 707. The second cover 707 is formed with engagement protruded parts 707c protruded toward the first cover 706, and the first cover 706 is formed with engaging projections 706c which are engaged with the engagement protruded parts 707c. Further, the first cover 706 is formed with an engagement protruded part 706d protruded toward the second cover 707, and the second cover 707 is formed with an engaging projection 707d which is engaged with the engagement protruded part 706d. Therefore, in a state that the second cover 707 is overlapped with the first cover 706, when the engagement protruded part 707c is engaged with the engaging projection 706c and the engagement protruded part 706d is engaged with the engaging projection 707d, the first cover 706 and the second cover 707 are connected with each other.

Further, the first cover 706 is formed with an engagement protruded part 706g protruded toward the first case member 701, and the first case member 701 is formed with an engaging projection 701g which is engaged with the engagement protruded part 706g. Therefore, in a state that the first case member 701, the support plate 703 and the second case member 702 are connected with each other, the first cover 706 is temporarily fixed by utilizing the engagement protruded part 706g and the engaging projection 701g and, in this state, the first cover 706 is fixed to the second case member 702 by the bolt 706r.

(Structure in First Space 70a)

Figure 10:
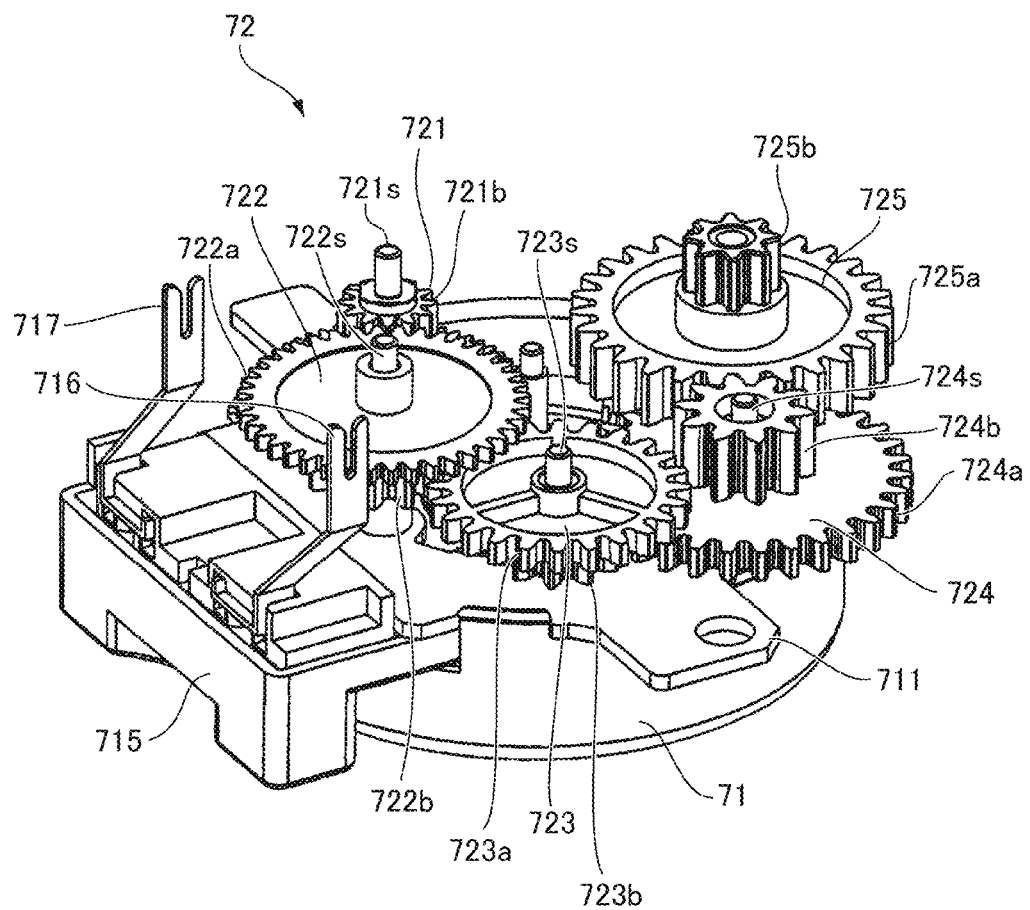
FIG. 10 is a perspective view showing a reduction gear mechanism which is used in the actuator shown in FIG. 5.

FIG. 10 is a perspective view showing the reduction gear mechanism 72 used in the actuator 7 shown in FIG. 5. In FIG. 8 and FIG. 9, the clutch motor 71 and the reduction gear mechanism 72 are disposed in the first space 70a sectioned by the first case member 701 and the support plate 703 on the one face 703a side of the support plate 703. The clutch motor 71 is a synchronous motor which is rotatable in only one direction. The clutch motor 71 is provided with a terminal block 715 which holds terminals 716 and 717.

As shown in FIG. 10, the reduction gear mechanism 72 includes a first gear 721 engaged with a motor pinion (not shown), a second gear 722 engaged with the first gear 721, a third gear 723 engaged with the second gear 722, a fourth gear 724 engaged with the third gear 723, and a fifth gear 725 engaged with the fourth gear 724.

More specifically, the first gear 721 is provided with a large diameter gear (not shown) engaged with the motor pinion and a small diameter gear 721b, and the second gear 722 is provided with a large diameter gear 722a engaged with the small diameter gear 721b of the first gear 721 and a small diameter gear 722b. The third gear 723 is provided with a large diameter gear 723a engaged with the small diameter gear 722b of the second gear 722 and a small diameter gear 723b. The fourth gear 724 is provided with a large diameter gear 724a engaged with the small diameter gear 723b of the third gear 723 and a small diameter gear 724b. The fifth gear 725 is provided with a large diameter gear 725a engaged with the small diameter gear 724b of the fourth gear 724 and a small diameter gear 725b. The fifth gear 725 is rotatably supported by a support shaft (not shown) which is held by an end plate 711 of the clutch motor 71. The first gear 721, the second gear 722, the third gear 723 and the fourth gear 724 are rotatably supported by support shafts 721s, 722s, 723s and 724s whose both ends are respectively held by the end plate 711 and the support plate 703.

In the reduction gear mechanism 72, rotation of the clutch motor 71 is decelerated and transmitted to the fifth gear 725, and the fifth gear 725 rotates a crank member 73 shown in FIG. 8.

(Structure in Second Space 70b)

Figure 11:
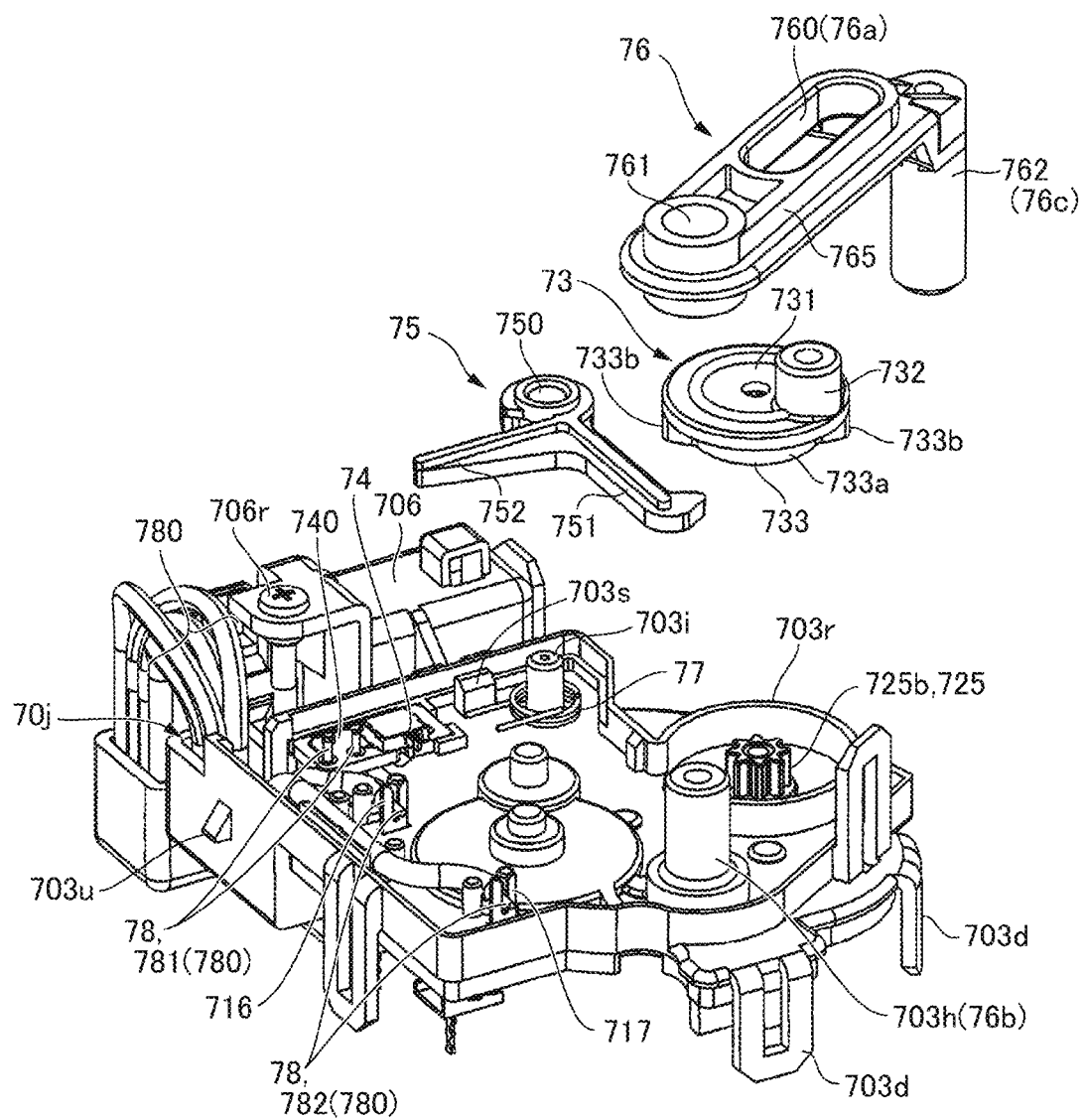
FIG. 11 is an exploded perspective view showing a structure on the other face side of a support plate which is used in the actuator shown in FIG. 5.

FIG. 11 is an exploded perspective view showing a structure on the other face 703b side of the support plate 703 which is used in the actuator 7 shown in FIG. 5. As shown in FIG. 8 and FIG. 11, the crank member 73, a switch 74, a switch lever 75, a base end side of the output arm 76 are disposed in a second space 70b sectioned by the support plate 703 and the second case member 702 on the other face 703b side of the support plate 703.

More specifically, the small diameter gear 725b of the fifth gear 725 which is described with reference to FIG. 10 and the like is protruded in an inside of a cylindrical tube part 703r of the support plate 703 in the second space 70b (the other face 703b side of the support plate 703), and the small diameter gear 725b is engaged with an internal tooth gear formed in the crank member 73. Specifically, the crank member 73 is provided with a circular plate part 731 and an eccentric pin 732 which is protruded to an upper side from the circular plate part 731 at a position separated from a rotation center axial line of the crank member 73. Further, the crank member 73 is provided with a body part 733 in a cylindrical tube shape which is protruded to a lower side from the circular plate part 731, and an internal tooth gear which is engaged with the small diameter gear 725b of the fifth gear 725 is formed on an inner peripheral face of the body part 733. Further, an outer peripheral face of the body part 733 is formed to be a cam face having a small diameter part 733a and a large diameter part 733b which are disposed in a circumferential direction. In the support plate 703, a part of the cylindrical tube part 703r is cut out and an outer peripheral face of the body part 733 is exposed through the cut-out part of the cylindrical tube part 703r.

An output arm 76 as an output member is disposed on the other face 703b side of the support plate 703, and the output arm 76 is provided with an extended part 765 whose tip end side is protruded to an outer side of the outer case 70 and a drive pin 762 which is protruded from the extended part 765 to a lower side. The extended part 765 of the output arm 76 is formed with an elongated hole 760 into which the eccentric pin 732 of the crank member 73 is fitted. An inner peripheral face of the elongated hole 760 is served as a force point 76a to which a drive force of the clutch motor 71 is transmitted through the eccentric pin 732 to swing the output arm 76. Further, one end (base end) of the output arm 76 is formed with a shaft hole 761. A shaft part 703h formed in the support plate 703 is fitted into the shaft hole 761, and a support point 76b when the output arm 76 is swung is structured by the shaft part 703h.

The drive pin 762 of the output arm 76 is fitted to the elongated hole 43 of the clutch member 40 described with reference to FIG. 4 and the like and is served as an operating point 76c which turns the clutch member 40 around the axial line "L". In other words, when the clutch motor 71 is rotated and the crank member 73 is turned in one direction, the output arm 76 is swung in one direction with the shaft part 703h (support point 76b) as a center and turns the clutch member 40 in one direction around the axial line "L". Next, when the crank member 73 is further turned in one direction, the output arm 76 is swung to the other direction with the shaft part 703h (support point 76b) as a center and turns the clutch member 40 to the other direction around the axial line "L" and mechanical connection/disconnection is performed. In this embodiment, the tip end side of the output arm 76 is protruded to the outside of the outer case 70 through the first opening part 70i (see FIG. 6) provided between the support plate 703 and the second case member 702, and the tip end side of the output arm 76 is fitted to the elongated hole 43 of the clutch member 40 described with reference to FIG. 4 and the like.

As described above, in this embodiment, the support point 76b, the force point 76a and the operating point 76c are disposed in this order from one end side of the output arm 76 to the other end side, and the force point 76a is provided between the operating point 76c and the support point 76b.

(Structure of Electric Connection Part and the Like)

In this embodiment, an electric connection part 78 between structural members is provided in the second space 70b sectioned by the support plate 703 and the second case member 702 on the other face 703b side of the support plate 703. More specifically, in the second space 70b, connected portions 781 are provided as the connection part 78 by soldering a wiring circuit board 740 on which the switch 74, which is turned on and off corresponding to a position of the output arm 76 (output member), is mounted to wiring line members 780. Further, the terminals 716 and 717 shown in FIG. 10 are protruded from the other face 703b of the support plate 703, and the connected portions 782 are provided as the connection part 78 by soldering the terminals 716 and 717 of the clutch motor 71 to the wiring line members 780. In this embodiment, the wiring line members 780 are extended from the inside of the outer case 70 to the outer side through the second opening part 70j provided between the support plate 703 and the second case member 702 and are connected with the wiring circuit board 791 shown in FIG. 9.

The switch 74 is a pushing type switch such as a microswitch, and a switch lever 75 which is displaced interlocked with the swing of the output arm 76 is disposed on the side. The switch lever 75 is provided with a shaft hole 750 into which a shaft part 703i formed in the support plate 703 is fitted, a first lever part 751 extended from a portion where the shaft hole 750 is formed to the body part 733 of the crank member 73, and a second lever part 752 extended from the portion where the shaft hole 750 is formed to the vicinity of the switch 74. The second lever part 752 is obliquely extended with respect to an extending direction of the first lever part 751. A torsion coil spring 77 is disposed at a root portion of the shaft part 703i, and both end parts of the torsion coil spring 77 are respectively abutted with a receiving part 703s of the support plate 703 and the first lever part 751. Therefore, a tip end part of the first lever part 751 is urged toward the body part 733 of the crank member 73.

Therefore, in a case that the crank member 73 is turned and the output arm 76 is swung, when the tip end part of the first lever part 751 is abutted with the small diameter part 733a of the body part 733 of the crank member 73, a tip end part of the second lever part 752 is separated from the switch 74 and thus the switch 74 is in an off-state. On the other hand, when the tip end part of the first lever part 751 is abutted with the large diameter part 733b of the body part 733 of the crank member 73, the tip end part of the second lever part 752 is abutted with the switch 74 and the switch 74 is turned on. Therefore, in the clutch device 10 shown in FIG. 3, when engagement of the teeth part 22a of the second rotor body 20 with the teeth part 13b of the first rotor body 13 is released by the clutch member 40, the switch 74 is turned off and, when the teeth part 22a of the second rotor body 20 and the teeth part 13b of the first rotor body 13 are engaged with each other by the clutch member 40, the switch 74 is turned on. Accordingly, connection and disconnection of the teeth part 22a of the second rotor body 20 with and from the teeth part 13b of the first rotor body 13 can be monitored based on an output from the switch 74.

Principal Effects in this Embodiment

As described above, in the actuator 7 of the clutch device 10 in this embodiment, the end part 703e of the support plate 703 is sandwiched between the first case member 701 and the second case member 702 and structures a part of the side face 70s of the outer case 70 and, in a portion where the end part 703e of the support plate 703 structures the side face 70s of the outer case 70, no gap space connecting the one face 703a side of the support plate 703 with the other face 703b side is existed around the support plate 703. Therefore, a foreign matter can be restrained from moving and passing around the support plate 703 between the one face 703a side of the support plate 703 and the other face 703b side. Accordingly, after the reduction gear mechanism 72 is disposed between the first case member 701 and the support plate 703, even when electric connection is performed by soldering on the other face 703b side of the support plate 703, a solder particle is prevented from dropping to a space where the reduction gear mechanism 72 is disposed (to the one face 703a side of the support plate 703) through a gap space existing around the support plate 703. As a result, a situation is prevented that a solder particle is caught and the reduction gear mechanism 72 is not operated properly. Further, in a case that grease is applied to the reduction gear mechanism 72, the grease is prevented from flowing into the side where the electric connection part 78 is provided (the other face side of the support plate) through a gap space around the support plate 703. Therefore, a situation is prevented that the switch 74 is not operated properly by the grease.

Further, in the end part 703e of the support plate 703, the first side wall 703f and the second side wall 703g are sandwiched between the first case member 701 and the second case member 702 and thus, large spaces can be secured between the first case member 701 and the support plate 703, and between the support plate 703 and the second case member 702.

Further, in the output arm 76 which is the output member of the actuator 7, it is structured that the support point 76b, the force point 76a and the operating point 76c are disposed in this order from one end side toward the other end side and thus, the support point 76b is not required to provide at a position protruded from the actuator main body (outer case 70). Therefore, the size of the actuator 7 can be reduced and, even when the size of the actuator 7 is reduced, a distance between the support point 76b and the force point 76a can be sufficiently secured and thus, deterioration of the torque transmission efficiency to the tip end (operating point 76c) of the output arm 76 can be restrained. Accordingly, in this embodiment, the size of the actuator 7 can be reduced.

Further, the reduction gear mechanism 72 is provided in the first space 70a structured between the first case member 701 and the support plate 703, and the support point 76b and the force point 76a of the output arm 76 are disposed in the second space 70b structured between the support plate 703 and the second case member 702. When structured as described above, especially, it is difficult that the support point 76b is provided at a position protruded from the actuator main body (outer case 70) and thus, the effect of at least an embodiment of the present invention is remarkable.

Other Embodiments

In the embodiment described above, the drive pin 762 of the output arm 76 is fitted into the elongated hole 43 of the clutch member 40. However, it may be structured that an engagement pin provided in the clutch member 40 is fitted to an elongated hole provided in the output arm 76. In the embodiment described above, the first side wall 703f and the second side wall 703g are provided in the end part 703e of the support plate 703. However, at least an embodiment of the present invention may be applied to a case that only one of the first side wall 703f and the second side wall 703g is provided, and to a case that neither the first side wall 703f nor the second side wall 703g is provided. In the embodiment described above, rotation of the clutch motor 71 is transmitted to the output arm 76 as rotary motion of the eccentric pin 732 of the crank member 73. However, at least an embodiment of the present invention may be applied to a case that rotary motion of the clutch motor 71 is converted into linear motion and is transmitted to the output arm 76. In the embodiment described above, as an example, the switch lever 75 and the pushing type switch 74 are used as a switch which is operated interlocked with swinging of the output arm 76. However, for example, a leaf switch described in Japanese Patent Laid-Open No. 2016-13348 and the like may be used. In the embodiment described above, the actuator 7 is disposed so that the drive pin 762 is extended downward (opposite side to the washing tub 3). However, the actuator 7 may be disposed so that the drive pin 762 is extended upward (to the washing tub 3 side).

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A clutch device comprising:
    an actuator; and
    a clutch member structured to be driven by the actuator to perform mechanical connection and disconnection;
    wherein the actuator comprises:
        a clutch motor;
        a reduction gear mechanism structured to transmit rotation of the clutch motor;
        an output member structured to be operated by a drive force of the clutch motor transmitted through the reduction gear mechanism;
        a support plate in which the reduction gear mechanism is disposed on a first face side and a connection part electrically connected with another member is disposed on a second face side which is an opposite side to first face side;
        a first case member which covers the support plate from the first face side and sections a first space in which the reduction gear mechanism is disposed between the support plate and the first case member; and
        a second case member which covers the support plate from the second face side and structures an outer case together with the first case member in a state that a second space in which the connection part is disposed is sectioned between the support plate and the second case member;
    wherein an end part of the support plate is sandwiched between the first case member and the second case member and structures a part of a side face of the outer case,
    wherein the support plate comprises:
    a plate part facing the first case member and the second case member; and
    a side wall which is protruded from a edge of the plate part toward at least one of the first case member and the second case member, and
    wherein the side wall is sandwiched as the end part of the support plate between the first case member and the second case member and structures the part of the side face of the outer case.

2. The clutch device according to, wherein the first case member, the end part of the support plate and the second case member are located on a common plane in the side face of the outer case.

3. The clutch device according to claim 2, wherein a labyrinth seal part in which a boundary between the first case member and the support plate is bent is structured between an inside of the outer case and an outside in an abutting part of the first case member with the end part of the support plate.

4. The clutch device according to claim 3, wherein a second labyrinth seal part in which a boundary between the support plate and the second case member is bent is structured between an inside of the outer case and an outside in an abutting part of the end part of the support plate and the second case member.

5. The clutch device according to claim 1, wherein an abutting part of the first case member with the end part of the support plate is provided over an entire periphery of the support plate.

6. The clutch device according to claim 1, wherein
the output member is protruded to an outside of the outer case through a first opening part provided between the support plate and the second case member, and
wiring line member used in the connection part is extended from an inside of the outer case to the outside through a second opening part provided between the support plate and the second case member.

7. The clutch device according to claim 1, wherein a labyrinth seal part in which a boundary between the first case member and the support plate is bent is structured between an inside of the outer case and an outside in an abutting part of the first case member with the end part of the support plate.

8. The clutch device according to claim 1, wherein a second labyrinth seal part in which a boundary between the support plate and the second case member is bent is structured between an inside of the outer case and an outside in an abutting part of the end part of the support plate and the second case member.

9. A washing machine comprising:
the clutch device defined in claim 1;
a washing machine motor;
a washing tub;
a pulsator disposed in the washing tub; and
a drive force transmission mechanism structured to transmit a rotation drive force of the washing machine motor to the washing tub and the pulsator;
wherein the drive force transmission mechanism comprises the clutch device on a way of a power transmission path from the washing machine motor to the washing tub.

10. The washing machine according to claim 9, wherein a labyrinth seal part in which a boundary between the first case member and the support plate is bent is structured between an inside of the outer case and an outside in an abutting part of the first case member with the end part of the support plate.

11. The washing machine according to claim 9, wherein a second labyrinth seal part in which a boundary between the support plate and the second case member is bent is structured between an inside of the outer case and an outside in an abutting part of the end part of the support plate and the second case member.

12. The washing machine according to claim 9, wherein an abutting part of the first case member with the end part of the support plate is provided over an entire periphery of the support plate.

\* \* \* \* \*